United States Patent [19]

Gladush et al.

[11] 4,279,963

[45] Jul. 21, 1981

[54] ENAMEL SLIP

[76] Inventors: Vasily M. Gladush, ulitsa Kirova, 7, kv. 41; Nena G. Eremenko, Topol, 3, korpus 2, kv. 45; Ljudmila V. Markina, prospekt Geroev, 11, kv. 29; Evgeny S. Kochuev, prospekt Pravdy, 67, kv. 363, all of Dnepropetrovsk; Mikhail P. Krainik, ulitsa; Suchkova, 228, kv. 2; Evgenia E. Cherkasova, ulitsa Shosseinaya, 2, kv. 9, both of Novomoskovsk; Nikolai M. Lyashenko, ulitsa Suchkova, 71, Novomoskovsk, all of U.S.S.R.

[21] Appl. No.: 132,098

[22] Filed: Mar. 20, 1980

[51] Int. Cl.$^3$ .................. B32B 15/04; B32B 17/06; C03C 5/06
[52] U.S. Cl. ................................ 428/433; 106/48
[58] Field of Search .................. 106/48, 49; 428/433

[56] References Cited

U.S. PATENT DOCUMENTS

| 3,298,860 | 1/1967 | Bryant et al. | 106/49 X |
| 4,196,004 | 4/1980 | Berretz | 106/48 |

OTHER PUBLICATIONS

Dodd, A. E., Dictionary of Ceramics-pub. 1964 by Philosophical Library Inc., N.Y.C., p. 190.

*Primary Examiner*—Helen M. McCarthy
*Attorney, Agent, or Firm*—Robert E. Burns; Emmanuel J. Lobato; Bruce L. Adams

[57] ABSTRACT

An enamel slip composition containing frit, an electrolyte, nepheline and water in the following amounts, parts by weight:

| frit | 100 |
| electrolyte | 0.8–2.5 |
| nepheline | 1.5–10 |
| quartz sand | 1–40 |
| water | 40–50 |

5 Claims, No Drawings

ENAMEL SLIP

FIELD OF THE INVENTION

The present invention relates to enameling of metal articles and, more specifically, to an enamel slip. Enamel slip is employed in glazing of household-application articles such as kitchen utensils, as well as industrial articles such as tubes for corrosion protection thereof.

Enamel slip comprises a suspension with its dispersed phase represented by particles of an enamel frit, clay and other substances employed for the manufacture of a slip; as the dispersing medium electrolyte-containing water is used.

BACKGROUND OF THE INVENTION

The enamel slip currently employed in the art usually contains an enamel frit, electrolytes, a dispersing agent and water. In addition, the composition of such enamel slip can incorporate quartz sand, feldspar for the purpose of increasing thermal and chemical resistance, as well as to enlarge the temperature range of the coating baking.

As the basic suspending agent clay is generally used which ensures a suspended state of the frit particles and imparts a predetermined consistence to the slip which is necessary for the application thereof onto the surface of metal articles. The clay-containing enamel slip is applied to articles by various methods such as dipping, casting, pulverization and the like. Thereafter, the coated article is subjected to baking, whereupon the coating is fused. Clay incorporated in the slip composition requires a higher baking temperature and causes such coating defects as bubbles, pores, "fish-scaling". Furthermore, clay does not have a stable composition which hinders the manufacture of a slip with stable properties. Due to rather limited sources of clay deposits, clay is not a readily available material. For this reason, in the art there is a persistent need in materials which could substitute for clay as a slip component. The use of bentonite, urea and methanol as a suspension agent is known in the art (cf. U.S. Pat. No. 2,824,458 Cl. 117-70, Int. Cl. C 23 d. 1958). The enamel slip composition disclosed in this U.S. Patent is employed for glass coating. This slip does not have stable properties and can be applied to articles only by spraying, while such coating methods as dipping and casting cannot be employed for application of the slip on metal articles. A slip composition is also known in the art, wherein as the suspending agent use is made of water-soluble high-molecular polymers (cf. French Pat. No. 2,002,314, Int. Cl. C 23 d 5/00, 1969). However, the polymer-containing slip is unstable and may be applied onto articles only by the spraying method.

Suspending agents according to the above-mentioned Patents do not allow a lowered baking temperature.

U.S. Pat. No. 3,278,332 Cl. 117-129, 1966, teaches the use, in a slip composition, of colloidal silica instead of clay; though the use of this material is limited by the high cost thereof; furthermore, silica does not lower the baking temperature.

An enamel slip composition is known in the art which contains fine fibers of asbestos and glass wool (cf. U.S. Pat. No. 2,563,502). However, the production of a slip with stable properties is hindered due to the unstable composition of thin-fiber materials.

A slip composition incorporating, in addition to other ingredients, palygorskite (USSR Inventor's Certificate No. 558880, Cl. CO3 c 7/00, 1977) is also known. This slip has a disadvantage residing in a high temperature of baking of the coating due to a high refractivity of palygorskite.

OBJECT OF THE INVENTION

It is an object of the present invention to provide a slip composition which makes it possible to lower the coating baking temperature and minimize the coating defects.

BRIEF SUMMARY OF THE INVENTION

This object is accomplished by the provision of an enamel slip composition containing frit, electrolytes, quartz sand and water which, according to the present invention, additionally contains nepheline and has the following composition, in parts by weight:

| frit | 100 |
| electrolytes | 0.8–2.5 |
| nepheline | 1.5–10.0 |
| quartz sand | 1.0–40.0 |
| water | 40–50 |

The present invention makes it possible to lower the baking temperature of the coating by 20°–50° C., increase its heat-resistance by 20°–40° C. and impact strength—by 0.01–0.02 kgm.

DETAILED DESCRIPTION OF THE INVENTION

The present invention relates to an enamel slip composition wherein clay is replaced with a new component, i.e. nepheline.

Nepheline is a wide-spread naturally-occurring product, therefore it is a readily available material.

By the term "nepheline" as used hereinafter, we mean nepheline, per se, and nepheline concentrates obtained as a by-product in apatite enriching.

The amount of nepheline in the slip composition should vary within the range of from 1.5 to 10.0 parts by weight. This range is selected due to the fact that an amount of nepheline below 1.5 parts by weight does not provide for stability of the resulting slip, whereas an amount exceeding 10 parts by weight causes impaired protective properties of the coating.

As the electrolyte incorporated in the slip composition according to the present invention use may be made of salts of mono-, bi- and trivalent meals, metal oxides, acids and similar substances.

The composition of the enamel slip according to the present invention is, as it has been mentioned hereinabove, the following, parts by weight:

| frit | 100 |
| electrolytes | 0.8–2.5 |
| nepheline | 1.5–10.0 |
| quartz sand | 1–40.0 |
| water | 40–50 |

The above-indicated components are used in specified amounts depending on the type and final use of the coating (primer, cover, primer-free coating).

The slip according to the present invention is prepared in the following manner.

The specified amount of the components are charged into a ball mill with water and ground to a fineness of not more than 7 Ferro units. Nepheline is preliminary ground to a small particle size. The slip containing nepheline has properties similar to those of a slip with clay; therefore, the resulting slip can be applied to metal articles by dipping, casting or spraying, whereas the prior art slip compositions can be applied to articles mainly by spraying.

For a better understanding of the present invention some specific Examples are given in Table 1 hereinbelow, wherein compositions I, II and III illustrate the slip of the present invention, while compositions IV, V, VI illustrate prior art slip formulations.

TABLE 1

| Components | Slip composition of the invention | | | Prior art slip compositions | | |
|---|---|---|---|---|---|---|
| | I | II | III | IV | V | VI |
| Frit I | 100 | — | — | 100 | — | — |
| Frit II | — | 100 | — | — | 100 | — |
| Frit III | — | — | 100 | — | — | 100 |
| Palygorskite | — | — | — | 2.0 | 1.8 | 1.8 |
| Nepheline | 1.5 | 5.0 | 10.0 | — | — | — |
| Quartz sand | 40 | 1.0 | 20.0 | 40 | — | 20 |
| Electrolytes: | | | | | | |
| Magnesia | 1.5 | 0.5 | — | — | — | — |
| Soda | 0.5 | — | — | — | — | — |
| Borax | 0.2 | — | — | 0.3 | — | 0.3 |
| $NaNO_2$ | 0.1 | 0.1 | 0.1 | — | 0.1 | — |
| $H_2SO_4$ | 0.2 | — | — | — | — | — |
| $MgSO_4$ | — | 0.2 | 0.3 | — | — | — |
| $MoO_3$ | — | — | 1.0 | — | — | — |
| $(NH_4)_2MoO_4$ | — | — | — | — | — | 0.8 |
| Water | 50 | 40 | 45 | 50 | 40 | 45 |

Frits I, II and III indicated in the foregoing Table 1 have compositions specified in Table 2 hereinbelow

TABLE 2

| Frit No. | Content of oxides, % | | | | | | | | | | | | | |
|---|---|---|---|---|---|---|---|---|---|---|---|---|---|---|
| | $SiO_2$ | $B_2O_3$ | $Al_2O_3$ | $K_2O$ | $Na_2O$ | $Li_2O$ | CaO | MgO | $Co_2O_3$ | $Ni_2O_3$ | $CaF_2Na_3AlF_6$ | | $TiO_2$ | $P_2O_5$ |
| I | 41,1 | 20,2 | 5,3 | — | 23,1 | — | — | — | 0,6 | 0,6 | 6,6 | 1,0 | 1,5 | — |
| II | 40,3 | 19,0 | 1,5 | 1,8 | 10,2 | — | — | 0,7 | — | — | — | 8,5 | 16,6 | 1,4 |
| III | 58,69 | 7,44 | — | 1,78 | 15,03 | 3,06 | 0,13 | — | 0,63 | 0,7 | 7,02 | 3,36 | 2,16 | — |

The enamel slip compositions I and III as indicated in Table 1 hereinbefore have been applied onto steel plates by dipping, dried and fused. The slip composition II has been applied onto primer-coated plates.

The baking temperature and properties of the resulting coatings are shown in Table 3 hereinbelow, wherein the compositions have the same Nos. as in Table 1. For the purpose of comparison, given in Table 3 are also the properties of the prior art slip compositions IV, V and VI.

TABLE 3

| Slip composition | Baking temperature, °C. | Heat resistance, °C. | Impact strength, kgm |
|---|---|---|---|
| 1 | 2 | 3 | 4 |
| I | 880 | 300 | 0.06 |
| II | 810 | 230 | 0.06 |
| III | 860 | 290 | 0.05 |
| IV | 920 | 280 | 0.05 |
| V | 840 | 210 | 0.04 |
| VI | 900 | 250 | 0.04 |

As can be seen from Table 3, the temperature of baking of the coating based on the slip compositions according to the invention is reduced by 30°–40° C., while heat-resistance is increased by 20°–40° C. and impact strength-by 0.01–0.02 kgm as compared to the prior art slip coatings.

What is claimed is:

1. An enamel slip containing frit, an electrolyte, quartz sand and water, characterized in that it contains nepheline as the suspending agent and has the following composition, parts by weight:

| frit | 100 |
|---|---|
| electrolyte | 0.8–2.5 |
| nepheline | 1.5–10 |
| quartz sand | 1.0–40 |
| water | 40–50 |

2. An enamel slip according to claim 1 which contains no clay and said nepheline is the sole suspending agent for said slip.

3. An enamel slip according to claim 2 which consists essentially of said frit, electrolyte, quartz sand, nepheline and water.

4. An enamel coating on a metal base having improved heat resistance and impact strength obtained by baking an enamel slip which has been applied to a metal base, said enamel slip containing nepheline as the suspending agent and no clay, and comprising in parts by weight:

| frit | 100 |
|---|---|
| electrolyte | 0.8–2.5 |
| nepheline | 1.5–10 |
| quartz sand | 1.0–40 |
| water | 40–50 |

5. An enamel coating according to claim 4 in which said slip consists essentially of said frit, nepheline, electrolyte, quartz sand and water.

* * * * *